(12) United States Patent
Fan

(10) Patent No.: US 6,877,322 B2
(45) Date of Patent: Apr. 12, 2005

(54) ADVANCED HYBRID COAL GASIFICATION CYCLE UTILIZING A RECYCLED WORKING FLUID

(75) Inventor: Zhen Fan, Parsippany, NJ (US)

(73) Assignee: Foster Wheeler Energy Corporation, Clinton, NJ (US)

( * ) Notice: Subject to any disclaimer, the term of this patent is extended or adjusted under 35 U.S.C. 154(b) by 35 days.

(21) Appl. No.: 10/663,699

(22) Filed: Sep. 17, 2003

(65) Prior Publication Data

US 2004/0123601 A1 Jul. 1, 2004

Related U.S. Application Data

(60) Provisional application No. 60/411,102, filed on Sep. 17, 2002.

(51) Int. Cl.[7] .............................................. F01K 23/06
(52) U.S. Cl. ...................................... 60/781; 60/39.12
(58) Field of Search ............................... 60/781, 39.12, 60/39.52

(56) References Cited

U.S. PATENT DOCUMENTS

| | | | | |
|---|---|---|---|---|
| 5,265,410 A | | 11/1993 | Hisatome | 60/39.12 |
| 5,517,815 A | | 5/1996 | Fujioka et al. | 60/39.12 |
| 5,572,861 A | | 11/1996 | Shao | 60/39.02 |
| 5,724,805 A | * | 3/1998 | Golomb et al. | 60/783 |
| 6,269,624 B1 | | 8/2001 | Frutschi et al. | 60/39.02 |
| 2004/0011057 A1 | * | 1/2004 | Huber | 60/781 |
| 2004/0079087 A1 | * | 4/2004 | Chandran et al. | 60/781 |

FOREIGN PATENT DOCUMENTS

| | | |
|---|---|---|
| EP | 0 453 059 A1 | 4/1991 |
| GB | 1 298 434 | 12/1972 |

OTHER PUBLICATIONS

Pruschek, Von R., et al. "Thermodynamische Analyse von Kombi–Prozessen mit integrierter Kohlevergasung und $CO_2$–Rückhaltung," *VGB Kraftwerkstechnik*, VGB Kraftwerkstechnik GmbH. Essen, Germany, vol. 73, No. 7, pp. 577–584.

DeLallo, Michael R., et al. "Evaluation Of Innovative Fossil Cycles Incorporating $CO_2$ Removal," 2000 Gasification Technologies Conference, San Francisco, CA, Oct. 8–11, 2000.

International Search Report dated Dec. 16, 2003, issued in corresponding PCT patent appln. No. OCT/IB03/03980, forwarded on Dec. 23, 2003.

* cited by examiner

*Primary Examiner*—Ehud Gartenberg
(74) *Attorney, Agent, or Firm*—Fitzpatrick, Cella, Harper & Scinto

(57) ABSTRACT

A power generating system having a hybrid gasification cycle, in which $CO_2$ is recycled to a gasifier to be used as a gasification reactant and working fluid. The power generating system includes a source of fresh, pure oxygen, a gasifier, a particle separator arranged in flow connection with the gasifier, a syngas combustor, a gas turbine arranged in flow connection with the syngas combustor, a steam generator arranged in flow connection with the outlet of the gas turbine, and a gas compressor system which discharges a stream of compressed exhaust gas. A first portion of the stream of compressed exhaust gas is conducted to the gasifier to control the temperature in the gasifier, to provide $CO_2$ and steam for gasification, and to decrease the demand for fresh, pure oxygen therein.

21 Claims, 1 Drawing Sheet

ADVANCED HYBRID COAL GASIFICATION CYCLE UTILIZING A RECYCLED WORKING FLUID

This application claims benefit of prior U.S. Provisional Application No. 60/411,102, filed Sep. 17, 2002.

FIELD OF THE INVENTION

My invention relates to a hybrid gasification cycle utilizing recycled working fluid, and a method of operating such a system, for generating electrical energy.

BACKGROUND OF THE INVENTION

The relationship between global climate change and the emission of greenhouse gases, such as carbon dioxide ($CO_2$), is well documented. Conventional fossil fuel combusting power plants, such as pulverized-coal-fired power plants, generate significant amounts of $CO_2$. Therefore, there is a seemingly constant drive to improve the efficiency of such power plants and to develop improved technologies to reduce their $CO_2$ emissions. One of the main solutions developed to achieve these goals is based on gasifying coal in a gasifier to generate syngas, which is combusted in a downstream combustor.

A recently published study by M. De Lallo, et al., "Evaluation of Innovative Fossil Cycles Incorporating $CO_2$ Removal," which was presented at the 2000 Gasification Technologies Conference in San Francisco, Calif., on Oct. 8–11, 2000, discusses several known processes for the removal/sequestration of $CO_2$ from coal-fired plants. The study revealed that such $CO_2$ removal and/or sequestration systems, when applied to the back end of a pulverized-coal-fired plant, can reduce plant efficiency by up to eleven percentage points with as much as a $30 per ton $CO_2$ removal cost. For the purpose of comparison, all dollar amounts discussed herein are expressed in terms of 2003 U.S. dollars.

In conventional oxygen-blown Integrated Gasification Combined Cycle (IGCC) plants, for example, carbon monoxide (CO) is frequently water-gas shifted to hydrogen ($H_2$) and $CO_2$ upstream of a gas turbine. Such $CO_2$ can then be separated and concentrated by absorption and stripping, or by membranes, and then compressed for sequestration. This type of a process, however, is energy intensive, costly, and lowers system efficiency due to $CO_2$ regeneration from solvent and the energy losses associated with shifting. (Because the lower heating value (LHV) of hydrogen is less than that of CO, on a per mole basis, 15% of the LHV is lost when CO is shifted to $H_2$. Therefore, more syngas needs to be generated from gasification in order to compensate for the shift loss. The low-grade heat from the shift reaction contributes to system losses.) It is estimated that there is an efficiency loss of six percentage points, combined with a $CO_2$ removal cost of $15 per ton, for IGCC plants utilizing such processes.

U.S. Pat. No. 6,269,624 discusses a combined cycle power generation process for combusting gaseous fuel with oxygen, where a portion of the carbon dioxide in the exhaust gas of a gas turbine is recycled to the gas turbine combustor. Carbon dioxide accumulated in the recycled gas is condensed downstream from a gas compressor connected to the gas turbine.

U.S. Pat. No. 5,572,861 discloses an IGCC process utilizing recycled carbon dioxide as dilution fluid in a series of gas turbine combustors. Carbon dioxide exhausted from the gas turbines is compressed in a multistage compressor, including interstage separation of a portion of the carbon dioxide, to be conducted to a condensation unit. According to the patent, syngas is produced by gasifying coal in a pressurized gasifier with a mixture of oxygen and steam. This process utilizes very complicated equipment, such as a high temperature compressor for the syngas.

Great Britain Patent No. 1 298 434 describes a process in which coal is gasified by using pure oxygen, and the produced gas is burned in a boiler furnace with oxygen. Water vapor is condensed from the flue gas of the boiler furnace, and a portion of the remaining carbon dioxide is recycled back to the gasifier and the furnace to control temperatures in the gasifier and the furnace. Another portion of the carbon dioxide is compressed in a multistage compressor and cooled in several steps, so as to form liquid carbon dioxide. The thermal efficiency of this cycle is, however, not very high, since power is generated only by a low efficiency, steam turbine based, Rankine cycle.

SUMMARY OF THE INVENTION

My invention provides a simple, hybrid gasification cycle system utilizing recycled working fluid, and a method of using the hybrid gasification cycle system, for efficient generation of electric energy.

My invention also provides a simple, hybrid gasification cycle system utilizing recycled working fluid, and a method of using the hybrid gasification cycle system to eliminate or reduce carbon dioxide emissions to the atmosphere.

In order to achieve these and other features and advantages of my invention, a new power generating apparatus and method are provided as follows.

According to one aspect, my invention relates to a power generating system. The power generating system includes a source of fresh, pure oxygen and a gasifier. The gasifier has a solid fuel inlet and a fresh, pure oxygen inlet, and operates at an elevated pressure $P_1$ to convert the solid fuel to syngas, comprising carbon monoxide (CO) and hydrogen ($H_2$), and a solid residue comprising char. A particle separator is arranged in flow connection with the gasifier for separating the char particles from the syngas emanating from the gasifier. A syngas combustor, having a fresh, pure oxygen ($O_2$) inlet and an inlet for syngas discharged from the particle separator, is provided for firing the syngas so as to produce exhaust gas comprising carbon dioxide ($CO_2$), water and excess oxygen. A gas turbine is arranged in flow connection with the syngas combustor, for expanding the exhaust gas so as to generate power with a generator connected to the gas turbine, and discharging expanded exhaust gas through an outlet of the gas turbine. A steam generator is arranged in flow connection with the outlet of the gas turbine, and includes an outlet for discharging processed exhaust gas. A gas compressor system is provided, having an inlet in flow connection with the outlet of the steam generator, and an outlet for discharging a stream of compressed exhaust gas. A first conductor conducts a first portion of the stream of compressed exhaust gas to the gasifier to control the temperature in the gasifier, to provide $CO_2$ and steam for gasification, and to decrease the demand for fresh, pure oxygen therein According to another aspect, my invention relates to a method of generating power. In the power generating method, fresh, pure oxygen is supplied from an oxygen source. Solid fuel and fresh, pure oxygen are introduced to a gasifier and the solid fuel is converted to syngas, comprising carbon monoxide (CO) and hydrogen ($H_2$), and a solid residue comprising char. Syngas emanating from the gasifier is conducted to a particle separator, and char particles are separated from the syngas in the particle separator. Syngas discharged from the particle separator is fired with fresh, pure oxygen in a syngas combustor, and exhaust gas comprising carbon dioxide ($CO_2$), water and excess oxygen is produced. The exhaust gas is expanded in a gas turbine arranged in flow connection with the syngas combustor, power is generated with a generator connected to the gas turbine, and the expanded exhaust gas is discharged through an outlet of the gas turbine. The expanded exhaust gas from the gas turbine is conducted to a steam generator and processed exhaust gas is discharged through an outlet of the steam generator. The processed exhaust gas from the steam generator is introduced to an inlet of a gas compressor system, and a stream of compressed exhaust gas is produced in the gas compressor system. A first portion of the stream of compressed exhaust gas is conducted to the gasifier, to control the temperature in the gasifier, to provide $CO_2$ and steam for gasification, and to decrease the demand for fresh, pure oxygen therein.

As used herein, the term "pure oxygen" should be construed broadly to include any stream of oxygen generated by a source of concentrated oxygen, such as a cryogenic air separator, a non-cryogenic air separator, such as a separation membrane or pressure swing adsorption system, oxygen storage tanks, or the like. By way of example, streams of oxygen generated by a cryogenic air separator typically have an oxygen content in excess of 95%, while streams generated by a non-cryogenic air separator typically have an oxygen concentration of between about 90% and about 95%. However, streams oxygen having a concentration of oxygen somewhat less than 90% are also encompassed by the term pure oxygen, so long as they are generated by a source of concentrated oxygen. The term "fresh" oxygen denotes oxygen that is supplied by the source of fresh, pure oxygen, as opposed to oxygen recycled in the system.

A better understanding of these and other aspects of my invention can be had by reference to the description of preferred embodiments and the drawing FIGURE.

Figure 1:
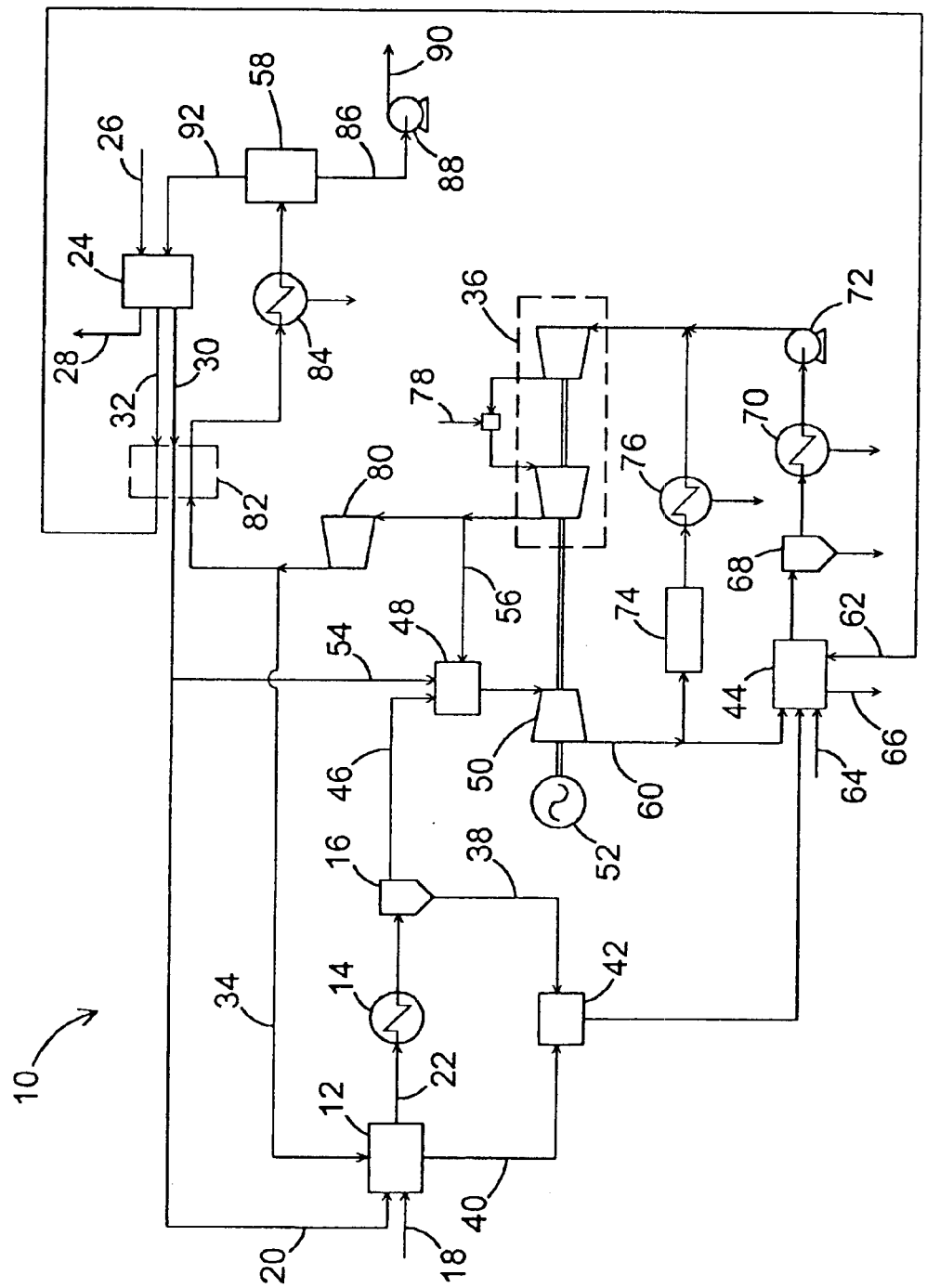
FIG. 1 is a schematic process flow diagram illustrating a power plant based on a hybrid coal gasification cycle in accordance with my invention.

Each of the components shown in block form in FIG. 1 is individually well known. Therefore, the details of such components are not discussed at length herein.

DESCRIPTION OF PREFERRED EMBODIMENTS

My invention provides an advanced hybrid gasification cycle, in which $CO_2$ is recycled to a gasifier to be used as a gasification reactant and working fluid. One preferred embodiment of my invention is described below, with reference to FIG. 1. A gasifier 12 is preferably a pressurized circulating fluidized bed (PCFB) gasifier operating at a pressure of up to about fifty-five atmospheres, or even higher, for gasifying solid fuel, such as coal. Correspondingly, the gas compressor system, which provides compressed gas comprising mainly carbon dioxide but also some water and oxygen to be recycled to the gasifier 12, increases the pressure of the exhaust gas to a pressure preferably at least as high as the operating pressure of the gasifier 12.

The syngas emanating from the gasifier 12 is preferably cooled in a syngas cooler 14 before char and other solid particles entrained with the syngas are separated in a particle separator 16. The particle separator 16 is preferably a unit of metal candle filters. If necessary, the syngas may be cleaned by conventional means from other substances detrimental to the gas turbine 50 before the syngas is conducted to a gas combustor 48.

The power generation system according to the present invention preferably comprises means (conductor) for conducting a portion of the stream of compressed exhaust gas to the syngas combustor 48, such as one or more of conduit, piping, tubing, hose, a manifold, and the like. While the exhaust gas comprises mainly carbon dioxide, it can be used for controlling the firing temperature in the syngas combustor 48 so as to control the formation of nitrogen oxides ($NO_X$) from the small amount of nitrogen that may exist in the syngas. Usually, the compressed exhaust gas comprises some water, which also assists in the $NO_X$ control. The gas also comprises some excess oxygen, which decreases the demand of fresh, pure oxygen in the syngas combustor 48.

The gas compressor system advantageously comprises a gas turbine compressor 36, connected to the axis of the gas turbine 50, and a booster compressor 80. The gas turbine compressor 36 usually compresses the exhaust gas to a pressure that is suitable for gas to be conducted to the syngas combustor 48, and the compression ratio of the booster compressor 80 is selected so that its outlet pressure corresponds to the pressure of the gasifier 12.

The gas turbine compressor 36 is advantageously a staged compressor comprising an interstage water injection cooling system 78 so as to reduce the power demand of the compressor, and to increase the humidity of the stream of compressed exhaust gas. In the present power generation cycle, the water injection system 78 assists in the $NO_X$ control of the syngas combustor 48 and enhances the gasification in the gasifier 12.

According to a preferred embodiment of the present invention, a third portion of the compressed exhaust gas is conducted from the outlet of the gas compressor system to a carbon dioxide condensing stage 58. If the exhaust gas is compressed, for example, to about fifty-five atmospheres, a pressure corresponding to the operating pressure of the gasifier 12, the carbon dioxide in the exhaust gas can be condensed simply by cooling the gas to a relatively high temperature, e.g., to about 15° C. Thus, in the present combined cycle, it is possible that the carbon dioxide condensing stage does not need separate compressors for $CO_2$ separation.

In order to avoid ice formation, water is separated from the exhaust gas in the carbon dioxide condensing stage 58, before the final condensation of carbon dioxide. By separating carbon dioxide from the exhaust gas, a vent stream 92 containing mainly pure oxygen is produced. Thus, the $CO_2$ condensing stage produces separate streams of condensed carbon dioxide and water, and a remaining stream comprising mainly oxygen. The produced liquid $CO_2$ can be sequestrated or used for various purposes. The vent stream 92, comprising mainly pure oxygen is preferably conducted to the air separation unit 24, i.e., to the source of fresh, pure oxygen 20, to enhance its efficiency. In some applications, it may be advantageous to conduct the vent stream 92 directly to the syngas combustor 48, for decreasing the demand of fresh, pure oxygen therein.

According to another preferred embodiment of the present invention, the system comprises a char-combusting boiler 44. In the char-combusting boiler 44, char collected as bottom ash of the gasifier 12, as well as that collected as fly ash in the particle separator 16 downstream from the gasifier 12, may be combusted with pure oxygen for producing steam. The char-combusting boiler 44 usually generates superheated steam for generating power with a steam turbine (not shown). The char-combusting boiler 44 is advantageously an atmospheric circulating fluidized bed (ACFB) boiler. Thus, the ash streams conducted from the pressurized gasifier 12 and the particle separator 16 have to be depressurized in a depressurizing unit 42 before being introduced to the char-combusting boiler 44.

The system for generating power according to my invention preferably comprises means (conductor) for conducting a portion of the exhaust gas discharged from the gas turbine 50 to the char-combusting boiler 44, such means for conducting may include one or more of conduit, piping, tubing, hose, a manifold, and the like. Due to the $CO_2$ and water in the exhaust gas, the exhaust gas conducted to the char-combusting boiler 44 controls the operating temperature of the char-combusting boiler 44. In addition, the excess oxygen in the exhaust gas decreases the demand of fresh, pure oxygen in the char-combusting boiler 44. The char-combusting boiler 44 produces flue gases, which may be cleaned by scrubbers or other conventional cleaning means, cooled by a cooler 70 to a temperature of about 65° C. and conducted through an induced draft fan 72 to the gas turbine compressor 36.

In some applications, it may be preferable to conduct a portion of the exhaust gas discharged from the gas turbine 50 through a heat recovery steam generator (HRSG) 74 to the gas compressor system using conducting means (conductor), such as one or more of conduit, piping, tubing, hose, a manifold, and the like. The division of the expanded exhaust gas between the HRSG 74 and the char-combusting boiler 44 may be varied depending on the operating mode of the system. Usually, the expanded exhaust gas is conducted at any time to only one of the HRSG 74 and the char-combusting boiler 44. It is also possible that the system comprises only means for conducting the expanded exhaust gases from the gas turbine 50 to the char-combusting boiler 44, or means to conduct the expanded exhaust gases from the gas turbine to the HRSG 74.

In more detail, the hybrid-cycle power plant 10, illustrated in FIG. 1, includes a partial gasifier 12—preferably, a pressurized circulating fluidized bed (PCFB) gasifier—a syngas cooler 14, and a particle separator 16. Preferably, the particle separator 16 is a porous metal barrier filter. Streams of solid fuel, such as coal 18, and pure oxygen 20 are introduced to the gasifier 12 to be converted therein into a stream of syngas 22 and a solid residue comprising char. Advantageously, the gasifier 12 operates at an elevated pressure, typically at a pressure of up to about fifty-five atm, but the pressure may be lower, or even higher than fifty-five atm.

As the constituents fed into the gasifier 12 react, hot syngas is produced. The syngas generally comprises carbon monoxide (CO) and hydrogen ($H_2$). In the PCFB gasifier 12, the syngas conveys some of the solid residue of the fluidized bed vertically up through the reactor and into a recycle cyclone (not shown). Solids elutriated from the bed and contained in the syngas are collected in the cyclone and returned via a dipleg (not shown) back to the dense bed at the bottom of the gasifier 12. This recycle loop of hot solids acts as a thermal flywheel and helps to promote efficient solids-gas chemical reaction. If required, sand can be added to the PCFB gasifier 12, to maintain the bed inventory and to promote the gasification process.

The stream of pure oxygen 20 originates from an oxygen source 24, which is preferably a cryogenic air separation unit (ASU), in which an incoming stream of air 26 is converted to separate streams of nitrogen ($N_2$) 28 and oxygen ($O_2$) 30. Advantageously, the ASU 24 produces separate streams of high-pressure oxygen 30 and close-to-ambient pressure oxygen 32 to be used for pressurized and atmospheric processes, respectively. In some applications of the present invention, the oxygen source 24 can be of some other type than a cryogenic separator, such as a separator based on pressure swing adsorption or membrane separation. It is also possible that the source of oxygen is simply a set of liquid oxygen tanks, which are regularly refilled from an external source.

Preferably, a stream 34 from a gas turbine compressor 36 (discussed below), comprising $CO_2$, $O_2$ and steam, is also injected into the gasifier 12, to provide constituents for the gasification reactions and to control the process temperature. It is possible to mix the stream 34 from the gas turbine compressor 36 and the stream 20 of pure oxygen before they are introduced to the gasifier 12. The process temperature of the gasifier 12 typically ranges from about 900° C. to about 1100° C., depending on the type of fuel.

After exiting from the recycle cyclone, the syngas typically passes through a fire-tube-type syngas cooler 14 into a particle separator 16, such as a porous metal (candle) barrier filter 16, where the syngas is cleaned of particulate matter. If desired, the syngas may be further cleaned in a cold-gas-clean-up step (not shown), which utilizes scrubbers or other conventional syngas cleaning equipment. The appropriate type of syngas cleaning equipment depends on several known factors, including the type and quality of fuel being utilized in the gasifier 12.

A stream of fly ash 38, collected by the particle separator 16, and/or a stream of bottom ash 40, removed from the PCFB gasifier 12, is preferably collected to a depressurizer 42, and routed to a char-combusting boiler 44, where char in the ashes is burned to produce steam for a steam turbine (not shown). The char-combusting boiler 44 is preferably an atmospheric circulating fluidized bed (ACFB) boiler, but it can also be some other type of boiler, such as a suspension-fired boiler.

A stream of cleaned syngas 46 is conducted to a gas combustor 48, to be combusted therein for producing hot gases, which are expanded in a gas turbine 50, to generate power by a generator 52. In the present system, preferably no water-gas shifting or $CO_2$ separation from the syngas is attempted upstream of the gas turbine 50. Therefore, the loss in cycle efficiency and gas turbine power associated with these operations are eliminated.

The syngas is fired in the syngas combustor 48 with pure oxygen 54 supplied from the air separation unit 24. Advantageously, a stream of compressed gas 56 from the gas turbine compressor 36 flows into the gas combustor 48. The compressed gas 56 comprises $CO_2$ and steam, which lower the temperature of the combustion reaction and thereby limit the amount of nitrogen oxides ($NO_X$) produced. The compressed gas 56 also comprises some oxygen, which decreases the demand for fresh, pure oxygen from the ASU 24. Moreover, the increased amount of gas in the combustion chamber provides for more efficient gas expansion and, consequently, more efficient power generation in the gas turbine 50. In some applications, an $O_2$ rich stream from a $CO_2$ condensation unit 58 (discussed below) may also be conducted (not shown in FIG. 1) to the gas combustor 48.

The exhaust gas 60 from the gas turbine 50 is a mixture of mostly $CO_2$, steam, and oxygen, in which the oxygen content is typically about 3% by volume. According to the present invention, this unused oxygen can be utilized in the gasifier 12, the gas combustor 48, and the char-combusting boiler 44. Correspondingly, a stream of exhaust gas 60 from the gas turbine 50 is preferably routed to the char-combusting boiler 44.

In the char-combusting boiler 44, char recovered from the gasifier 12 and/or particle separator 16, and depressurized in the depressurizer 42, is combusted by using a stream of pure oxygen 62, produced in the air separation unit 24, as the main oxidant. The stream of hot exhaust gas 60 from the gas turbine 50 provides additional oxygen to the char-combustion. Due to its high $CO_2$ content, the exhaust gas controls the temperature of the char-combustor 44. Advantageously, the char-combusting boiler 44 produces superheated steam, which is used to drive a steam turbine (not shown) to generate power.

In a preferred embodiment of the present invention, the gasifier 12 operates with carbon conversions of about 60% to about 80% with bituminous coal, and close to 95% with sub-bituminous coal. As an example, when fueled with Illinois #6, approximately twenty to forty percent of the coal carbon will appear in the char residue to be combusted in the char-combusting boiler 44. When necessary, a stream of additional solid fuel, such as coal 64, can also be introduced to the char-combusting boiler 44.

Preferably, limestone, ammonia and/or urea are also injected into the char-combusting boiler 44 to control sulfur dioxide ($SO_2$) and $NO_X$ production. Limestone generally sequesters $SO_2$ by capturing it as calcium sulfate ($CaSO_4$). Ammonia and/or urea, on the other hand, chemically reduce $NO_X$ to nitrogen gas ($N_2$) and water. Bottom ash 66 is preferably collected from the char-combusting boiler 44 and removed from the system to a landfill or the like.

The exhaust from the char-combusting boiler 44 is preferably routed through a dust collector 68, such as a bag house, and a cooler 70. The bag house 68, which contains a series of filters, removes the majority of the fly ash in the exhaust gas. The exhaust gas is cooled in the cooler 70 to a low temperature, e.g., to about 30° C. In the cooler 70, some water can be condensed and removed from the exhaust gas. After cooling, the gas preferably flows through an induced-draft fan 72 before being conducted to the gas turbine compressor 36.

Exhaust gas 60 from the gas turbine 50, or a portion of it, can also be conducted to a heat recovery steam generator (HRSG) 74, where superheated steam is produced, to drive a steam turbine (not shown), by extracting heat from the hot exhaust gas. Optionally, a portion of the cleaned syngas 46 can be conducted (not shown) to the HRSG 74, and combusted therein to increase the energy content of the exhaust gas. The exhaust gas of the HRSG 74 is finally cooled in a gas cooler 76 to a low temperature, e.g., about 30° C. At this cooling stage, part of the water vapor in the exhaust gas is removed from the system. The cooled exhaust gas is then sent to the gas turbine compressor 36.

The gas turbine compressor 36 is preferably a staged compressor with interstage cooling by water injection 78. The water injection 78 reduces the compression power requirement, and increases the humidity of the compressed exhaust gas. When the compressed exhaust gas is conducted to the gasifier 12 and the gas combustor 48, the increased steam content of the compressed gas enhances the gasification in the gasifier 12, and assists $NO_X$ control in the gas combustor 48.

The compressed exhaust gas, comprising $CO_2$, $O_2$ and steam, is preferably split into three parts. A large portion of the gas is injected into the gas combustor 48 and expanded in the gas turbine 50. The rest of the compressed exhaust gas may be further compressed by a final compressor 80 (booster compressor), before being split into a portion conducted into the gasifier 12 and a portion conducted to the $CO_2$ condensing stage 58.

The compressed gas conducted to the $CO_2$ condensing stage 58 is preferably first cooled in a heat exchanger 82 by transferring heat to the cold streams of $O_2$ 30, 32 discharged from the ASU 24. The compressed gas is cooled further in a cooler 84 to first remove water from the exhaust gas and then to liquefy the $CO_2$ in the exhaust gas. Because the $CO_2$ is at a high pressure, the temperature required to liquefy the $CO_2$ is rather high, e.g., about 16° C. for a pressure of 57 atm. The $CO_2$ condensing stage 58 provides a stream 86 of condensed $CO_2$, which is preferably pressurized further by a pump 88 and sent through a $CO_2$ pipeline 90 for disposal or further use.

After the $CO_2$ condensing stage, the remaining exhaust gas is a stream of cold gas 92, comprising mainly oxygen. The stream of cold gas 92 is preferably conducted to the air separator 24 to reduce $O_2$ duty, to save power and to serve as coolant for the air separator 24. Alternatively, the $O_2$ rich gas 92 may be conducted (not shown) to the gas combustor 48, thereby further reducing the need for fresh, pure oxygen therein.

Sulfur dioxide ($SO_2$) existing in the compressed exhaust gas, originating, e.g., from the char-combustor 44, may be condensed in the $CO_2$ condensing stage 58, together with the $CO_2$. Therefore, especially when the produced liquid $CO_2$ is disposed, it is possible to eliminate separate sulfur capture equipment from the present hybrid gasification cycle.

The above-described plant allows for the efficient and economic utilization of a wide range of relatively inexpensive coals, while addressing the damaging effect of $CO_2$ on the environment. Benefits include the ability to sequester $CO_2$ without the need for costly energy-intensive shifting, chemical/physical absorption, and/or stripping. For example, expected $CO_2$ removal costs using a plant in accordance with the present invention are less than $10 per ton, as opposed to conventional plants where the costs can range from $30 per ton for a pulverized coal plant to $15 per ton for a conventional oxygen-blown IGCC plant.

Other benefits of the above-described plant include (i) the minimization of overall oxygen consumption by recycling excess oxygen contained in the exhaust gases, (ii) eliminating the large steam requirement required in conventional IGCC plants for supporting the water shift reaction, and (iii) reducing the power requirements of the $CO_2$ sequestration compressor by making $CO_2$ available at the discharge pressure of the gas compressor, or by eliminating altogether the need for a separate compressor for $CO_2$ sequestration that conventional IGCC plants typically employ.

Thus, a plant in accordance with my invention will provide a system for electrical power generation with a simpler, more reliable, and less expensive means for eliminating coal-fueled plant $CO_2$ emissions, and will greatly reduce losses in plant efficiency associated with conventional techniques of removing $CO_2$ from the exhaust gas and preparing it for the transmission to a sequestering site.

The foregoing examples are exemplary of preferred embodiments of my invention. However, as those skilled in the art will understand, many of the aspects of my invention described above, such as, for example, the gasifier and char subsystems, may take other forms, depending on the requirements of the plant. Moreover, while the above-described arrangement of components is the presently preferred configuration, it should be understood that the various components of the system may be rearranged and/or used in different combinations with one another, depending on various design considerations.

One of ordinary skill in the art will realize that these and other various modifications and variations are possible within the spirit and scope of my invention, which is intended to be limited in scope only by the accompanying claims, which should be accorded the broadest interpretation so as to encompass all such modifications, equivalent structures and functions.

I claim:

1. A power generating system comprising:
   a source of fresh, pure oxygen ($O_2$);
   a gasifier, having a solid fuel inlet and a fresh, pure oxygen inlet, operating at an elevated pressure $P_1$ to convert the solid fuel to syngas, comprising carbon monoxide (CO) and hydrogen ($H_2$), and a solid residue comprising char;
   a particle separator arranged in flow connection with said gasifier for separating the char particles from the syngas emanating from said gasifier;
   a syngas combustor, having a fresh, pure oxygen inlet and an inlet for syngas discharged from the particle separator, for firing the syngas so as to produce exhaust gas comprising carbon dioxide ($CO_2$), water and excess oxygen;
   a gas turbine arranged in flow connection with said syngas combustor, for expanding the exhaust gas so as to generate power with a generator connected to said gas turbine, and discharging expanded exhaust gas through an outlet of said gas turbine;
   a steam generator, arranged in flow connection with said outlet of said gas turbine, comprising an outlet for discharging processed exhaust gas;
   a gas compressor system having an inlet in flow connection with said outlet of said steam generator, and an outlet for discharging a stream of compressed exhaust gas; and
   a first conductor that conducts a first portion of the stream of compressed exhaust gas to said gasifier to control the temperature in said gasifier, to provide $CO_2$ and steam for gasification, and to decrease the demand for fresh, pure oxygen therein.

2. A system according to claim 1, further comprising a second conductor that conducts a second portion of the stream of compressed exhaust gas to said syngas combustor to control the temperature of said syngas combustor and to decrease the demand for fresh, pure oxygen therein.

3. A system according to claim 2, wherein said gas compressor system comprises a gas turbine compressor connected to an axis of said gas turbine, and a booster compressor, compressing the exhaust gas to a pressure of at least the pressure $P_1$ of said gasifier, said second conductor being connected to an outlet of said gas turbine compressor and conducting the second portion of the stream of compressed exhaust gas to said syngas combustor.

4. A system according to claim 3, wherein said gas turbine compressor comprises an interstage water injection system which reduces power demand of said gas compressor system and humidifies the stream of the compressed exhaust gas, thereby assisting $NO_X$ control in said syngas combustor and enhancing gasification in said gasifier.

5. A system according to claim 1, further comprising a carbon dioxide condensing stage in flow connection with said outlet of said gas compressor system, for producing a stream of condensed $CO_2$ and a remaining stream comprising mainly $O_2$.

6. A system according to claim 5, further comprising a third conductor that conducts the remaining stream of mainly $O_2$ from said carbon dioxide condensation stage to said cryogenic air separator, and wherein said source of fresh, pure oxygen comprises a cryogenic air separator.

7. A system according to claim 1, further comprising a char-combusting boiler having an inlet for fresh, pure oxygen and char discharged from at least one of said gasifier and said particle separator, to combust the char so as to produce steam, for generating power, and flue gas to be conducted to said inlet of said gas compressor system.

8. A system according to claim 7, wherein said char-combusting boiler is an atmospheric circulating fluidized bed boiler.

9. A system according to claim 7, wherein said steam generator comprises said char-combusting boiler.

10. A system according to claim 1, wherein said steam generator comprises a heat recovery steam generator.

11. A system according to claim 1, wherein said gasifier is a pressurized circulating fluidized bed gasifier.

12. A system according to claim 1, wherein said particle separator comprises at least one metal candle filter.

13. A method of generating power, comprising the steps of:
   (a) supplying fresh, pure oxygen from an oxygen source;
   (b) introducing solid fuel and fresh, pure oxygen to a gasifier and converting the solid fuel to syngas, comprising carbon monoxide (CO) and hydrogen ($H_2$), and a solid residue comprising char;
   (c) conducting syngas emanating from the gasifier to a particle separator, and separating char particles from the syngas in the particle separator;
   (d) firing syngas discharged from the particle separator with fresh, pure oxygen in a syngas combustor, and producing exhaust gas comprising carbon dioxide ($CO_2$), water and excess oxygen;
   (e) expanding the exhaust gas in a gas turbine arranged in flow connection to the syngas combustor, generating power with a generator connected to the gas turbine, and discharging expanded exhaust gas through an outlet of the gas turbine;
   (f) conducting expanded exhaust gas from the gas turbine to a steam generator and discharging processed exhaust gas through an outlet of the steam generator;
   (g) introducing processed exhaust gas from the steam generator to an inlet of a gas compressor system, and producing a stream of compressed exhaust gas in the gas compressor system; and
   (h) conducting a first portion of the stream of compressed exhaust gas to the gasifier to control the temperature in the gasifier, to provide $CO_2$ and steam for gasification, and to decrease the demand for fresh, pure oxygen therein.

14. A method according to claim 13, comprising the further step of:
   (i) conducting a second portion of the stream of compressed exhaust gas to the syngas combustor, for controlling the temperature of the syngas combustor and for decreasing the demand for fresh, pure oxygen therein.

15. A method according to claim 14, wherein in step (g) the processed exhaust gas is first compressed in a gas turbine compressor, connected to the axis of the gas turbine, to a pressure $P_2$, and secondly in a booster compressor to a pressure of at least the pressure $P_1$ of the gasifier, and in step (i) the compressed exhaust gas is conducted from the gas turbine combustor, at the pressure $P_2$, to the syngas combustor.

16. A method according to claim 15, comprising the further step of:
   (j) injecting water to the exhaust gas between stages of the gas turbine compressor, so as to reduce compression power demand and to humidify the stream of compressed exhaust gas, for assisting $NO_X$ control in the syngas combustor, and for enhancing gasification in the gasifier.

17. A method according to claim 13, comprising the further step of:
   (k) conducting a third portion of the stream of compressed exhaust gas to a carbon dioxide condensing stage and producing a stream of condensed carbon dioxide and a remaining stream comprising mainly oxygen.

18. A method according to claim 13, wherein the oxygen source is a cryogenic air separator, and the method comprises the further step of:
   (l) conducting the stream comprising mainly oxygen from the carbon dioxide condensation stage to the oxygen source.

19. A method according to claim 13, comprising the further step of:
   (m) producing steam, for generating power, and flue gas in a char-combusting boiler by combusting char discharged from at least one of the gasifier and the particle separator with fresh, pure oxygen, and conducting the flue gas to the inlet of the gas compressor system.

20. A method according to claim 19, wherein in step (f) the steam generator comprises the char-combusting boiler.

21. A method according to claim 13, wherein in step (f) the steam generator comprises a heat recovery steam generator.

* * * * *